United States Patent [19]

Reade

[11] 4,255,199
[45] Mar. 10, 1981

[54] STABLE, CHEMICALLY-STRENGTHENABLE LITHIUM ALUMINOSILICATE GLASSES

[75] Inventor: Richard F. Reade, Corning, N.Y.

[73] Assignee: Corning Glass Works, Corning, N.Y.

[21] Appl. No.: 91,549

[22] Filed: Nov. 5, 1979

[51] Int. Cl.$^3$ .......................... C03C 3/10; C03C 3/30; C03C 21/00
[52] U.S. Cl. .................................. 106/53; 106/47 Q; 428/410
[58] Field of Search ................... 106/470, 55; 428/410

[56] References Cited

U.S. PATENT DOCUMENTS

| | | | |
|---|---|---|---|
| 3,615,320 | 10/1971 | Junge et al. | 428/410 |
| 3,790,430 | 2/1974 | Mochel | 106/52 |
| 4,156,755 | 5/1979 | Rinehart | 428/410 |
| 4,177,319 | 12/1979 | Jahn | 106/47 Q |

Primary Examiner—O. R. Vertiz
Assistant Examiner—Mark Bell
Attorney, Agent, or Firm—Clinton S. Janes, Jr.

[57] ABSTRACT

This invention is concerned with the production of glasses in the $Li_2O$-$PbO$-$Al_2O_3$-$SiO_2$ system which resist the development of devitrification at temperatures approaching the softening point of the glass, which resist surface wrinkling, haze, devitrification, spalling, and cracking when held for several hours at temperatures above the annealing point of the glass but below the softening point thereof, which can be chemically strengthened to demonstrate modulus of rupture values in excess of 60,000 psi, which display excellent chemical durability, and which, in the most preferred embodiment, exhibit a refractive index of 1.523. Such glasses consist essentially, expressed in terms of weight percent on the oxide basis as calculated from the batch, of

| | |
|---|---|
| $SiO_2$ | 59–71% |
| $Al_2O_3$ | 20–28 |
| $Li_2O$ | 4.5–7.5 |
| PbO | 3–9 | wherein the mole ratio $Al_2O_3$:$Li_2O$+PbO ranges about 0.95–1.05.

3 Claims, No Drawings

4,255,199

STABLE, CHEMICALLY-STRENGTHENABLE LITHIUM ALUMINOSILICATE GLASSES

BACKGROUND OF THE INVENTION

That the strength of alkali metal silicate glass articles can be significantly enhanced through an ion exchange reaction, termed chemical strengthening, is well known to the glass art. The process contemplates contacting such glass articles with an external source of cations having larger ionic diameters than the alkali metal ions present in the glass composition. Most frequently, the larger-diameter cations are other alkali metal ions. The contact is made at elevated temperatures, but below the strain point of the glass, so that an ion exchange reaction takes place wherein the smaller alkali metal ions pass out of the glass and the larger cations move into the sites of the glass surface previously occupied by the smaller ions. Because the exchange reaction is conducted at temperatures below the strain point of the glass, viscous flow in the glass surface is inhibited. Consequently, the larger cations are, in essence, stuffed or crowded into the sites formerly filled by the small alkali metal ions, which phenomenon causes the development of compressive stresses in the surface of the glass article. It is this surface compression layer which imparts improved mechanical strength to the glass article.

That alkali metal aluminosilicate glass articles are especially adaptable to chemical strengthening has been disclosed in U.S. Pat. No. 3,790,430 and experience has indicated that lithium aluminosilicate glasses are notably outstanding in this regard. Nevertheless, the high viscosity and the extreme tendency to devitrify at elevated temperatures, particularly in the vicinity of the softening point, exhibited by the simple lithium aluminosilicate glasses have limited their utility to applications which do not require reheating in their shaping. hence, such processes as, for example, the sagging of already-formed ophthalmic lens blanks or the re-drawing of glass cane and tubing, are not suited to those glasses.

The most widespread use of chemical strengthening has been seen in the manufacture of ophthalmic lens. The food and Drug Administration (FDA) has decreed that all glass ophthalmic lenses must survive the drop of a steel ball having a diameter of 0.625" from a height of 50". The common ophthalmic lenses of commerce, having a thickness of about 2 mm, are highly susceptible to breakage in that test unless such are subjected to thermal tempering or chemical strengthening, with the latter providing greater strength improvements than obtained via thermal tempering.

The density of glasses employed in ophthalmic lenses is considerably greater than that of plastic utilized in ophthalmic lens fabrication. Accordingly, the capability of achieving very high mechanical strengths in a glass suitable for the production of ophthalmic lenses would permit the use of thinner cross sections which, in turn, would result in a lens of lighter weight.

OBJECTIVES OF THE INVENTION

The principal objectives of the instant invention are five:

(1) to provide lithium aluminosilicate glasses which are resistant to gross devitrification at elevated temperatures, especially at temperatures in the vicinity of the softening point of the glass;

(2) to provide such glasses which also demonstrate excellent resistance to surface wrinkling, haze, devitrification, spalling, and cracking when maintained for several hours at elevated temperatures, i.e., above the annealing point of the glass but below the softening point thereof;

(3) to provide glass compositions having base compositions within the $Li_2O-Al_2O_3-SiO_2$ system, but modified to exhibit some softening or fluxing effect when compared to the simple $Li_2O-Al_2O_3-SiO_2$ ternary;

(4) to provide glasses displaying very high chemical strengthening capability, as evidenced by modulus of rupture values in excess of 60,000 psi; and (5) to provide glasses which will demonstrate the characteristics set forth in (1)-(4) above and will be suitable for ophthalmic lenses; i.e., the index of refraction manifested by the glasses can be corrected to 1.523, or higher values where necessary, and the chemical durability of the glasses is acceptable for ophthalmic applications.

SUMMARY OF THE INVENTION

Laboratory investigations have indicated that glasses in the simple $Li_2O-Al_2O_3-SiO_2$ system exhibit maxima in chemical strengthening capability where the molar ratio $Al_2O_3:Li_2O$ is about 1. Unfortunately, however, such glasses are highly prone to devitrify at temperatures in the vicinity of the softening point of the glass. This extreme propensity to devitrify has been utilized to produce a large variety of glass-ceramic articles containing beta-quartz solid solution and/or beta-spodumene solid solution as the predominant crystal phase. The compositions therefor include such nucleation agents as $TiO_2$, $ZrO_2$, and $SnO_2$ which, upon heat treatment, cause internal nucleation and crystal growth resulting in strong, low expansion, fine-grained, highly crystalline materials. It is quite apparent that the production of thermally stable glasses precludes the presence of any ingredient which would initiate nucleation.

Nevertheless, even in the absence of recognized nucleating agents, glasses in the $Li_2O-Al_2O_3-SiO_2$ system evidence a strong proclivity toward surface devitrification at elevated temperatures leading to surface wrinkling, cracking, haze, etc. the crux of the instant invention resides in the partial molar substitution of PbO for $Li_2O$ in the glass compositions such that the mole ratio $Al_2O_3:Li_2O+PbO$ ranges about 0.95–1.05. Sucii a substitution has been found to be much more efficacious in accomplishing the above-stated objectives than the incorporation into the base $Li_2O-Al_2O_3-SiO_2$ compositions of such components as alkali metal oxides, alkaline earth metal oxides, fluxing glass formers such as $B_2O_3$ and $P_2O_5$, and mechanical fluxes such as fluoride.

In general, the melting and forming behavior, as well as the physical properties and the capability for chemical strengthening, are more favorable in those glasses wherein the $Li_2O-Al_2O_3-SiO_2$ stoichiometry varies over the range of about $Li_2O\cdot Al_2O_3\cdot 4\text{-}6SiO_2$. Although glasses containing higher $SiO_2$ contents can be formed, the ion exchange strengthening is much more efficient with higher concentrations of $Li_2O$. On a molar basis with the stoichiometry of $Li_2O\cdot Al_2O_3\cdot 4\text{-}6SiO_2$, the most useful substitutions of PbO for $Li_2O$ vary between about 0.5–1.5 moles.

Accordingly, glasses operable in the present invention consist essentially, in weight percent on the oxide basis as calculated from the batch, of:

| | |
|---|---|
| $SiO_2$ | 59–71% |
| $Al_2O_3$ | 20–28 |
| $Li_2O$ | 4.5–7.5 |
| PbO | 3–9 |

Whereas minor amounts of fluoride and compatible metal oxides such as the other alkali metal oxides, the alkaline earth metal oxides, $B_2O_3$, and $P_2O_5$ can be tolerated, the most preferred compositions will consist essentially solely of the four above-recited constituents in the indicated ranges with the total of all additions not exceeding about 5%. The fluoride content will be held below 1%.

DESCRIPTION OF THE PREFERRED EMBODIMENTS

Table I records several glass compositions, expressed in terms of parts by weight on the oxide basis as calculated from the batch, illustrating the parameters of the instant invention. Because the sum of the individual components totals or approximates 100, for all practical purposes the values reported may be deemed to reflect weight percent. The actual batch ingredients may comprise any materials, either the oxide or other compound, which, when melted in combination with the other constituents, will be converted into the desired oxide in the proper proportions. $As_2O_3$ was included in the batch in its customary capacity as a fining agent. Table IA lists the batch components in terms of moles to better illustrate the inventive substitution of PbO for $Li_2O$ on a molar basis. It will be observed from Table IA that the mole ratio $Al_2O_3:Li_2O+$ substitutions for $Li_2O$, if any, ranges slightly above unity. Inasmuch as it is not known with which cations(s) the fluoride is combined, it is merely tabulated in terms of $AlF_3$, the batch ingredient employed to incorporate fluoride into the glass.

Example 1 lists a glass of approximately $Li_2O\cdot Al_2O_3\cdot 5SiO_2$ stoichiometry and Examples 2–7 illustrate operable PbO-containing compositions covering stoichiometries over the range $Li_2O\cdot Al_2O_3\cdot 4\text{-}6SiO_2$. Examples 8–10 report $B_2O_3$ additions to PbO-containing glasses and Examples 11–16 recite additions other than PbO to the base $Li_2O\text{-}Al_2O_3\text{-}SiO_2$ compositions. It will be noted that $Na_2O$ and CaO were substituted for part of the $Li_2O$, $B_2O_3$ and $P_2O_5$ were substituted on a cationic basis for part of the $SiO_2$, and F was merely included as an overall addition.

The batch materials were compounded, ballmilled together to aid in achieving a homogeneous melt, and then deposited into platinum crucibles. A lid was placed upon each crucible and the covered crucibles moved to a furnace operating at 1650° C. After melting overnight (about 16 hours), cane of about 0.25″ was hand-drawn from the melts and the remainder of the molten batch poured into slabs having dimensions of about 6″ × 6″ × 0.5″. The cane samples were cooled in the ambient air and the slabs were immediately transferred to an annealer operating at about 550° C.

TABLE I

| | 1 | 2 | 3 | 4 | 5 | 6 | 7 | 8 |
|---|---|---|---|---|---|---|---|---|
| $SiO_2$ | 68.5 | 61.4 | 59.4 | 66.5 | 64.6 | 70.4 | 68.7 | 59.1 |
| $Al_2O_3$ | 24.0 | 27.4 | 26.6 | 23.8 | 23.1 | 21.0 | 20.5 | 27.8 |
| $Li_2O$ | 6.8 | 7.1 | 6.4 | 6.2 | 5.6 | 5.5 | 4.9 | 7.2 |
| $As_2O_3$ | 0.6 | 0.3 | 0.3 | 0.3 | 0.3 | 0.3 | 0.3 | 0.3 |
| PbO | — | 3.8 | 7.4 | 3.3 | 6.4 | 2.9 | 5.7 | 3.9 |
| $B_2O_3$ | — | — | — | — | — | — | — | 1.8 |

TABLE I-continued

| | 9 | 10 | 11 | 12 | 13 | 14 | 15 | 16 |
|---|---|---|---|---|---|---|---|---|
| $SiO_2$ | 64.5 | 68.7 | 64.6 | 63.5 | 67.6 | 67.7 | 67.9 | 63.9 |
| $Al_2O_3$ | 24.0 | 21.2 | 24.6 | 24.2 | 23.7 | 23.8 | 22.8 | 22.8 |
| $Li_2O$ | 6.2 | 5.5 | 7.0 | 6.9 | 5.4 | 5.4 | 6.8 | 6.9 |
| $As_2O_3$ | 0.3 | 0.3 | 0.6 | 0.6 | 0.6 | 0.6 | 0.6 | 0.6 |
| PbO | 3.3 | 2.9 | — | — | — | — | — | — |
| $B_2O_3$ | 1.6 | 1.4 | 3.3 | 1.6 | — | — | — | 3.2 |
| $Na_2O$ | — | — | — | — | 2.8 | — | — | — |
| CaO | — | — | — | — | — | 2.5 | — | — |
| $P_2O_5$ | — | — | — | 3.3 | — | — | — | — |
| $AlF_3$ | — | — | — | — | — | — | 2.5 | 2.6 |

TABLE IA

| | 1 | 2 | 3 | 4 | 5 | 6 | 7 | 8 |
|---|---|---|---|---|---|---|---|---|
| $SiO_2$ | 37.5 | 30.0 | 30.0 | 3.75 | 37.5 | 45.0 | 45.0 | 28.5 |
| $Al_2O_3$ | 7.75 | 7.90 | 7.90 | 7.90 | 7.90 | 7.90 | 7.90 | 7.90 |
| $Li_2O$ | 7.50 | 7.00 | 6.50 | 7.00 | 6.50 | 7.00 | 6.50 | 7.00 |
| $As_2O_3$ | 0.10 | 0.045 | 0.045 | 0.05 | 0.05 | 0.055 | 0.055 | 0.045 |
| PbO | — | 0.5 | 1.0 | 0.5 | 1.0 | 0.5 | 1.0 | 0.5 |
| $B_2O_3$ | — | — | — | — | — | — | — | 0.75 |

| | 9 | 10 | 11 | 12 | 13 | 14 | 15 | 16 |
|---|---|---|---|---|---|---|---|---|
| $SiO_2$ | 36.0 | 43.5 | 34.5 | 34.5 | 37.5 | 37.5 | 37.5 | 34.5 |
| $Al_2O_3$ | 7.90 | 7.90 | 7.75 | 7.75 | 7.75 | 7.75 | 7.25 | 7.25 |
| $Li_2O$ | 7.00 | 7.00 | 7.50 | 7.50 | 6.00 | 6.00 | 7.50 | 7.50 |
| $As_2O_3$ | 0.050 | 0.055 | 0.10 | 0.10 | 0.10 | 0.10 | 0.10 | 0.10 |
| PbO | 0.5 | 0.5 | — | — | — | — | — | — |
| $B_2O_3$ | 0.75 | 0.75 | 1.50 | 0.75 | — | — | — | — |
| $Na_2O$ | — | — | — | — | 1.50 | — | — | — |
| CaO | — | — | — | — | — | 1.50 | — | — |
| $P_2O_5$ | — | — | — | 0.75 | — | — | — | — |
| $AlF_3$ | — | — | — | — | — | — | 1.00 | 1.00 |

Table II reports physical property data obtained primarily utilizing cane samples as test specimens. Determinations of the refractive index ($n_D$), softening point (Soft.), annealing point (Ann.), and the coefficient of thermal expansion (Exp.) of each glass were conducted employing test procedures conventional in the glass art. The softening and annealing points are recited in terms of °C. and the coefficients of thermal expansion over the range 0°–300° C. are recorded in terms of $\times 10^{-7}/°C$.

The reported sag test provides a simple means for observing the behavior of a glass when subjected to elevated temperatures. As recorded in Table II, cane samples were suspended on sillimanite forms spaced apart to yield a three-inch span. The specimens were thereafter heated at 400° C./hour to 800° C., maintained at that level for four hours, and then cooled in the ambient air. After cooling, the samples were inspected visually and the amount of sag or thermal deformation measured in millimeters.

Chemical strengthening determinations were undertaken by immersing several four-inch long cane samples into a bath of molten $NaNO_3$ operating at 400° C. After about two hours, the samples were removed from the bath and allowed to cool. The adhering salt was removed therefrom with tap water, the samples were dried, and modulus of rupture values (psi) measured on abraded samples utilizing techniques standard in the glass art. The figures tabulated reflect average values of several measurements.

The chemical durability of the glasses was determined via an immersion of test samples for 30 minutes in a bath of aqueous 3N HCl solution operating at room temperature (20°–25° C.). None of the test samples evidenced any attack by that solution, thereby indicating the utility of the glasses on the score for ophthalmic applications.

TABLE II

| | 1 | 2 | 3 | 4 | 5 | 6 | 7 | 8 |
|---|---|---|---|---|---|---|---|---|
| PHYSICAL | | | | | | | | |
| Soft. | Devit. | 910° | 897° | 947° | 944° | 986° | 970° | — |
| Ann. | 715° | 688° | 674° | 705° | 695° | 718° | 712° | — |
| Exp. | 47 | 58 | 58 | — | 45 | — | 37 | — |
| $n_D$ | 1.510 | 1.528 | 1.534 | — | 1.520 | — | 1.514 | — |
| SAG TEST | | | | | | | | |
| Appearance | OK | OK | OK | OK | OK | OK | OK | Wrinkled |
| Sag | 3 | 7 | 12 | 6 | 10 | 4 | 6 | 17 |
| STRENGTH | | | | | | | | |
| M.O.R. | 84,900 | 91,000 | 83,100 | 82,400 | 76,000 | 75,000 | 67,900 | 85,100 |

| | 9 | 10 | 11 | 12 | 13 | 14 | 15 | 16 |
|---|---|---|---|---|---|---|---|---|
| PHYSICAL | | | | | | | | |
| Soft. | — | 942° | 845° | 910° | 955° | 935° | 903° Devit | 837° |
| Ann. | — | 690° | 632° | 670° | 716° | 716° | 645° | 603° |
| Exp. | — | — | 55 | 40 | 46 | 46 | 48 | 57 |
| $n_D$ | — | 1.510 | — | — | — | — | — | — |
| SAG TEST | | | | | | | | |
| Appearance | Minor Wrinkles | Slight Wrinkles | Wrinkled | Wrinkled | Slight Wrinkles | OK | Hazy, Spalling | Wrinkled, Spalling |
| Sag | 15 | 11 | Softened | 15 | 5 | 6 | 2 | 3 |
| STRENGTH | | | | | | | | |
| M.O.R. | 78,600 | 68,300 | 68,300 | 83,500 | 68,100 | 73,100 | 67,300 | 61,200 |

It is believed apparent from an inspection of the physical property, sag test, and strength data reported in Table II that the molar substitution of PbO for $Li_2O$ accomplishes the objectives of the present invention. For example, reference glass Example 1, approximating the $Li_2O \cdot Al_2O_3 \cdot 5SiO_2$ stoichiometry, devitrifies in the range of the softening point, but exhibits high refractoriness in the sag test and a great capability for chemical strengthening. Moreover, its refractive index is too low for ophthalmic use. The PbO-containing variations of that composition, viz., Examples 2–7, do not devitrify in the softening range, demonstrate some fluxing action (the softening point of Example 1 would be higher than 990° C. if it could be measured), maintain good surface quality during the sag test, manifest excellent abraded strength, and increased refractive indices. Examples 2 and 3, having lower $SiO_2$ contents, are especially noteworthy, in view of the inherent strong tendency of comparable ternary $Li_2O-Al_2O_3-SiO_2$ glasses to devitrify. Those glasses successfully resist surface-induced devitrification and/or distortion, display excellent strength after exposure to an ion exchange reaction, and bracket the required refractive index (1.523) for ophthalmic applications. Such glasses would be very suitable for the production of sagged lens blanks from which thin, light weight, high strength, ophthalmic lenses could be fabricated. Such glass would also be operable in the production of sagged-to-shape non-prescription eyeglasses, although the refractive index correction would not be demanded for that application. In both instances, however, the PbO content would be of value in decreasing unwanted ultraviolet transmission through the glass.

In general, the $B_2O_3$-containing glasses (Examples 8–12 and 16) manifest considerable fluxing relative to the sample $Li_2O-Al_2O_3-SiO_2$ ternary glass, but assume an unacceptable degree of surface wrinkling during high temperature heat treatment. The addition of $B_2O_3$ alone reduces the abraded strength of the glass considerably, but, when present in concert with $P_2O_5$ (Example 12) or PbO (Example 8–10), yields excellent strengths. Finally, $B_2O_3$ acts to reduce the refractive index of the glass. Example 10, which reflects a high silica glass, viz., a $Li_2O \cdot Al_2O_3 \cdot 6SiO_2$ stoichiometry, containing PbO and $B_2O_3$, seems to imply that a slightly higher $SiO_2$ or, more preferably, PbO level might completely eliminate surface wrinkling. Such a combination could be optimized to provide efficient fluxing for viscous $Li_2O-Al_2O_3-SiO_2$ glasses.

The fluoride-containing glasses (Examples 15 and 16) demonstrate excessive surface crystallization and are unacceptable because of the development of haze, spalling, and cracking therein. The $Na_2O$-containing glass (Example 13) undergoes wrinkling at elevated temperatures and the CaO-containing glass (Example 14) has a steep viscosity curve which adversely affects its forming capabilities. And, of course, these latter two glasses exhibit refractive indices below the 1.523 required for ophthalmic applications.

I claim:

1. A glass having a composition within the general ternary system $Li_2O-Al_2O_3-SiO_2$ wherein the stoichiometry varies over the range of about $Li_2O \cdot Al_2O_3 \cdot 4-6SiO_2$ and wherein PbO is substituted for $Li_2O$ in amounts between about 0.5–1.5 moles, which resists the development of devitrification at temperatures in the vicinity of the softening point of the glass, which resists surface wrinkling, cracking, spalling, haze, and devitrification when held for several hours at temperatures above the annealing point of the glass but below the softening point thereof, which can be chemically strengthened to demonstrate modulus of rupture values in excess of 60,000 psi, which displays excellent chemical durability, and which consists essentially, expressed in terms of weight percent on the oxide basis as calculated from the batch, of

| | |
|---|---|
| SiO$_2$ | 59–71 |
| Al$_2$O$_3$ | 20–28 |
| Li$_2$O | 4.5–7.5 |
| PbO | 3–9 | wherein the mole ratio Al$_2$O$_3$:Li$_2$O+PbO ranges between about 0.95–1.05.

2. A glass according to claim 1 also containing up to 5% total of other alkali metal oxides, alkaline earth metal oxides, B$_2$O$_3$, P$_2$O$_5$, and fluoride, the fluoride content not exceeding 1%.

3. A glass according to claim 1 having a refractive index of about 1.523.

* * * * *